(No Model.)
W. B. WARD.
STONE MOLDING AND SURFACING MACHINE.
No. 496,022. Patented Apr. 25, 1893.
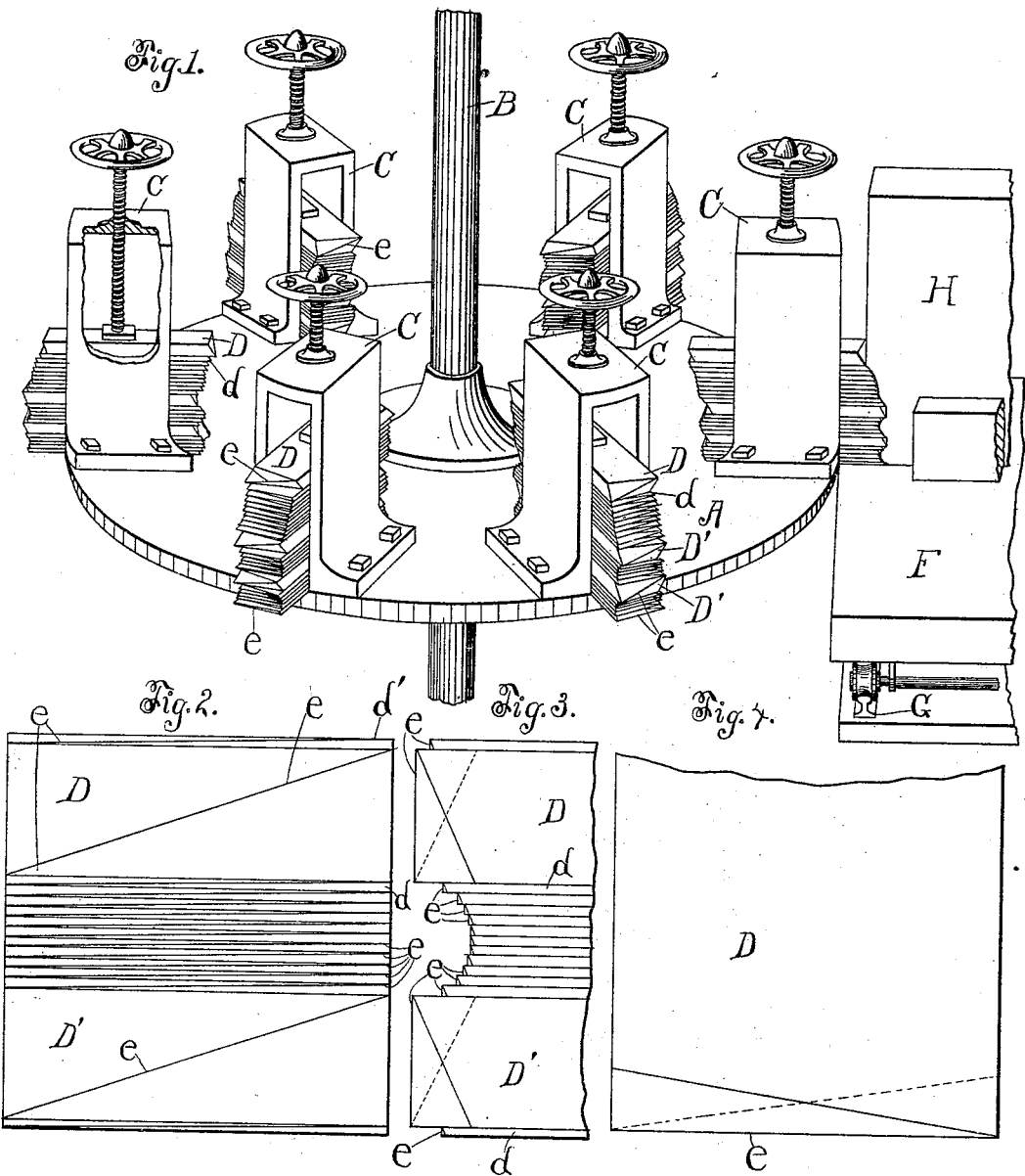

UNITED STATES PATENT OFFICE.

WILLIAM B. WARD, OF LOS ANGELES, CALIFORNIA.

STONE MOLDING AND SURFACING MACHINE.

SPECIFICATION forming part of Letters Patent No. 496,022, dated April 25, 1893.

Application filed September 6, 1892. Serial No. 445,196. (No model.)

*To all whom it may concern:*

Be it known that I, WILLIAM B. WARD, a citizen of the United States, residing at Los Angeles, in the county of Los Angeles and State of California, have invented a new and useful Stone Molding and Surfacing Machine, of which the following is a specification.

The object of my invention is to provide a machine for making stone moldings and for surfacing stone which will perform effective work and which can be changed at pleasure to produce various patterns.

My invention is specially adapted for working marble and stone of tractable nature.

The accompanying drawings illustrate my invention.

Figure 1 shows the operative part of my machine in perspective and also shows a carriage at one side with a block of marble arranged in position to be operated upon by the machine. Fig. 2 is an end view of a series of the cutters forming a part of the pattern. Fig. 3 is a side elevation of the ends of the cutters shown in Fig. 2. Fig. 4 is a plan of one end of one of the cutters.

My invention consists essentially in the combination of a revoluble plate A fixed upon a driving shaft B and provided with a series of cutter clamps C and a series of cutters D D' d d' &c. adapted to be arranged so that their ends will conform to the pattern of the molding and having, respectively, a cutting edge e arranged to extend diagonally across the end of the cutter from one upper corner to the opposite lower corner.

My invention also embraces a flat cutter for rotary molding machines, rectangular in cross section and having a cutting edge arranged across the end of the cutter extending diagonally from one upper corner to the opposite lower corner of such rectangular cross section.

In the drawings F indicates a carriage running upon a track G, and H indicates the block of marble in position to be operated upon.

In practice the cutters are placed in the clamps and are then set in position by forcing them into contact with a fixed molding pattern, which in the drawings is illustrated by the block H, which being stationary will cause the several series of cutters to assume the same pattern and to stand at a uniform distance from the center of revolution of the plate, such plate being revolved to bring the several series respectively and successively into position for contact with the pattern block while the series are being set. When the cutters of one series have been properly adjusted they are secured in place by the clamp and the next series are then brought into position, adjusted, and clamped, and when all have been adjusted and secured the machine is ready for operation. The shaft is driven by suitable power not shown and the block of marble or other tractable stone is brought into position to be engaged by the edges of the cutters.

The cutting edges of the cutters are oblique to the plane of rotation and the operation of such cutters upon the stone is as follows:— The corner edge of each cutter strikes into the stone thus chipping it slightly and the diagonal edge follows along scraping and cutting away the stone in a manner that is not accomplished by a machine in which the edges of the cutters are parallel with the plane of rotation and smoother work is accomplished.

Now having described my invention, what I claim as new, and desire to secure by Letters Patent, is—

1. In a rotary stone working machine, a revoluble plate having a series of flat cutters clamped together and provided respectively with cutting edges arranged diagonally across the ends of such cutters oblique to the plane of rotation.

2. The stone molding and surfacing machine set forth comprising the combination of a revoluble plate; means for revolving such plate; a series of cutter clamps arranged respectively to clamp a series of cutters to such plate, and such series of cutters provided respectively at their ends with cutting edges arranged oblique to the plane of rotation.

WILLIAM B. WARD.

Witnesses:
F. M. TOWNSEND,
ALFRED I. TOWNSEND.